Sept. 8, 1964   A. E. MURGUIA   3,147,569
CONTAINER FOR PLANTS
Filed Dec. 18, 1961
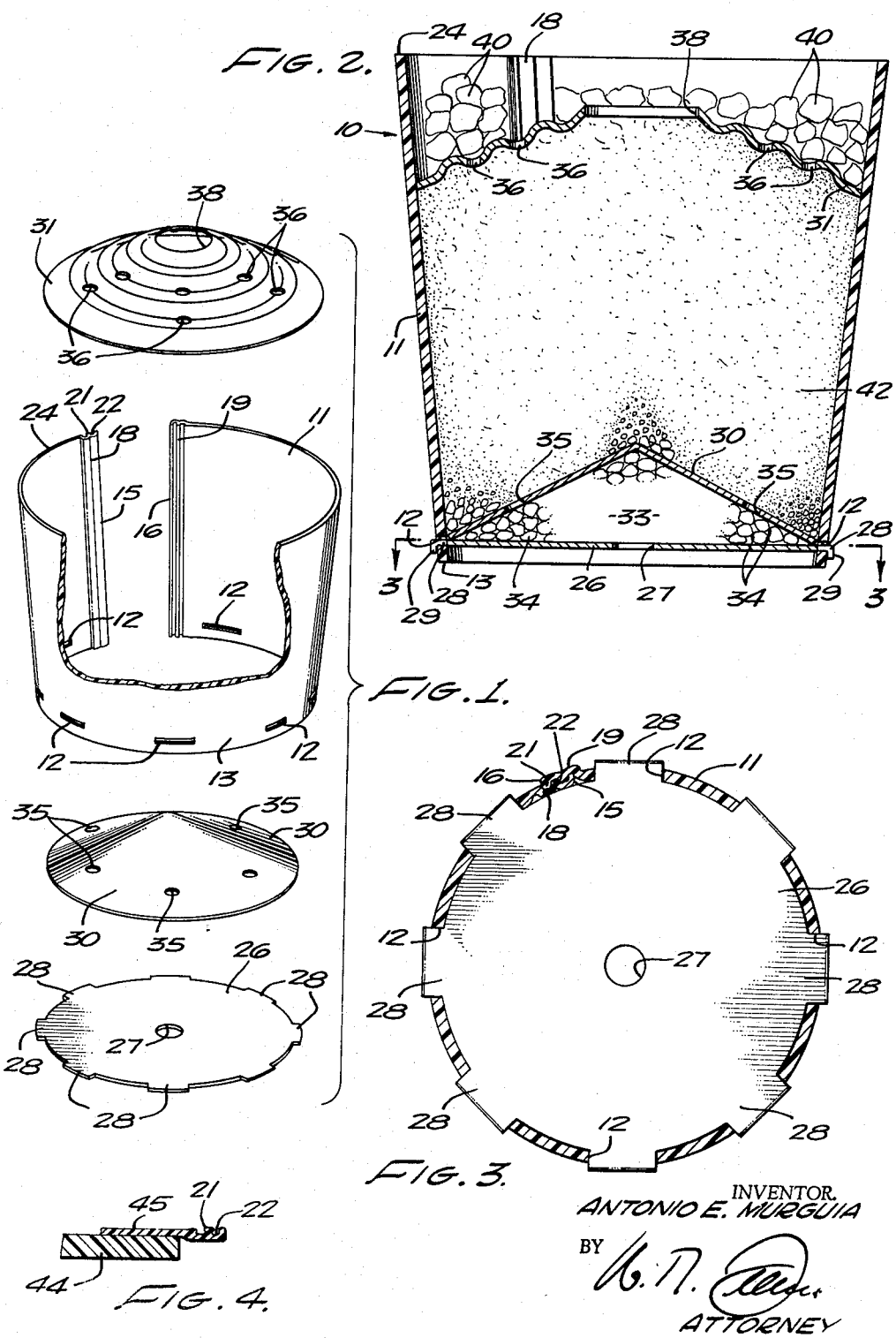
INVENTOR.
ANTONIO E. MURGUIA
BY
ATTORNEY

United States Patent Office 3,147,569
Patented Sept. 8, 1964

3,147,569
CONTAINER FOR PLANTS
Antonio E. Murguia, 1009 W. Deodor, Oxnard, Calif.
Filed Dec. 18, 1961, Ser. No. 159,883
1 Claim. (Cl. 47—37)

This invention relates, generally, to containers for nursery plants, and more particularly, to a collapsible container featuring substantially flat or flexible parts which may be repeatedly assembled and disassembled, and be compactly bundled upon disassembly for shipping or storage, and which may be easily removed from around the root ball of a plant for transplanting purposes.

In the plant nursery industry it is desirable to employ plant receptacles adapted to be readily removed from the plants contained therein without damage to the plant or to the receptacle. Another desirability is that the material and construction of the plant container or receptacle be such as to permit flat stacking for compact storage or shipping. It is also important that the material from which the container is constructed be resistant to corrosion by water, fertilizers and chemicals used in the growing of plants. There is also a need for a nursery pot having barriers for separating various components of the contents of the pot.

In addition to offering the above desideratum, containers of this invention may be readily and repeatedly assembled and disassembled by hand. This demountable feature of the invention facilitates cleaning and simple maintenance of the several parts.

In view of the above advantages and features, an object of this invention is the provision of a nursery plant container which may readily be assembled and disassembled without tools.

Another object is the provision of a nursery plant container of durable materials and adapted for easy disassembly for compact storage and shipment.

It is another object of this invention to provide a nursery plant container comprising a sheet of flexible material having interengaging fasteners on its ends such that the sheet may be fashioned to a tubular configuration with a bottom of the container serving to maintain the sheet in its assembled configuration.

Another object is the provision of a nursery plant container of the above mentioned character and having a partition for separating various plant feeding compositions in the container.

A further object of the invention is the provision of a nursery plant container which may be quickly assembled and disassembled by hand and comprises a flexible sheet having openings along an edge thereof for receiving lugs on a bottom member to secure the sheet in a tubular configuration, there being detachable fastening means on overlapping edges of the sheet which are interengaged to maintain the container in its assembled form and adapted to be readily detached from one another in disassembly of the container.

The manner in which the advantages of this invention are more particularly realized and its further objects and features are achieved will become more clearly apparent from the subsequent detailed description of the invention considered with the drawing wherein:

FIGURE 1 is an exploded perspective view of a container of this invention;

FIGURE 2 is an enlarged central vertical section through the container;

FIGURE 3 is a cross section taken along line 3—3 in FIGURE 2; and

FIGURE 4 is a detail section of a modified form of fastener for a container of this invention.

Referring to FIGURES 1 through 3 in particular, there is shown one form of a dismountable plant container of this invention designated generally by reference numeral 10. The container has its side wall formed from a sheet 11 of flexible thermoplastic material, the polyethylene and polyvinyl chloride resins being suitable examples. Sheet 11 has a plurality of spaced elongated openings or slots 12 extending adjacent one side edge 13 thereof. Along its end edges 15 and 16 the sheet is provided with integral fastener strips 18 and 19 comprising interlocking tongue and groove formations 21 and 22, respectively. These tongue and groove formations face in opposite directions from the flat sheet whereby they will be in confronting registry when the sheet is in tubular form. Hand pressure is sufficient to slide the confronting tongue and groove formations into interlocking engagement to form a water-tight fastening seam. For the illustrated container 10, its top edge 24, i.e., a side edge of sheet 11, is longer than its bottom edge 13, whereby the side wall of the container is of tubular frusto-conical configuration.

Container 10 includes a flat circular bottom member 26 of stiff sheet material, e.g., plastic or metal. It is this bottom member which functions to maintain the sheet 11 in its tubular configuration. Bottom member 26 has a central opening 27 for passage of excess water from the container and also a circumferentially arranged series of spaced radial projections 28 adapted to extend through the slots 12. These projections may be bent at their ends 29 on the outside of side wall 11 as shown in FIGURE 2.

Spacers 30 and 31 of stiff sheet material are provided which also function to maintain side wall 11 in tubular configuration and to partition the inside of the container. Lower spacer member 30 is of shallow conical shape, includes moisture passing apertures 35, and defines between itself and bottom member 26 a space 33 for containing charcoal or other suitable plant feeding material 34, with its peripheral edge fitted within the side wall 11 and preferably adjacent the bottom 26. The upper spacer member 31 is of shallow conical shape, is formed with circular corrugations, and also has moisture passing apertures here indicated by the reference character 36. Spacer 31 is sized to closely fit the interior of tubular wall 11 near its top, thus to maintain the tubular shape of the wall 11 in the upper part of the container. There is an enlarged central opening 38 in spacer 31 to accommodate the stem of a plant in the container. If desired, decorative pebbles 40 may be placed on top of spacer 31, and the space it forms with the spacer 30 is filled with soil or mulch material 42.

FIGURE 4 shows another way of providing fastener strips on the ends of a sheet 44 for the side wall of a container of this invention. Instead of forming the tongues and grooves 21 and 22 directly in the sheet material 11 of the embodiment of FIGURES 1–3, an extruded tape 45 having tongues 21 and grooves 22 is suitably secured as by adhesives to the opposite ends of sheet 44 which corresponds to the sheet 11 of the first embodiment.

It is apparent that for storage and shipping purposes, corresponding parts of containers may be compactly stacked and bundled together.

To assemble a container the sheet 11 is placed around the bottom 26 with the radial projections 28 extending through openings 12 and the tongues and grooves of strips 18 and 19 are pressed into interlocking engagement. A supply of charcoal 34 is then placed upon the bottom 26 and the spacer member 30 inserted within the side wall 11. The space above the member 30 is then filled with soil or mulch 42 and the root ball of a plant embedded therein. Finally, the spacer member 31 is arranged within the side wall 11 to cover the soil 42 and the decorative pebbles or stones 40 are deposited upon the member 31.

To disassemble the container, as for transplanting purposes, the fastener seam 18, 19 may be easily pulled apart with an action similar to a tearing motion. The sheet 11 may then be unwrapped from the bottom 26.

While the particular container for plants herein shown and disclosed in detail is fully capable of attaining the objects and providing the advantages hereinbefore stated, it is to be understood that it is merely illustrative of the presently preferred embodiments of the invention and that no limitations are intended to the details of construction or design hereinshown other than as defined in the appended claim.

I claim:

A readily demountable flower pot adapted to be compactly packaged in knocked down condition for storage when not in use, said flower pot having a soft flexible main body of thin sheet plastic material adapted to be held in a taut extended condition by a filling of soil, said main body being of smaller diameter at its lower base end than at its upper end, said main body material being non-corrosive, impervious to moisture and having a separable fluid-tight seam extending lengthwise thereof, said seam having interlocking tongues and grooves of plastic material cooperating to hold the main body positively assembled but being separable under oppositely directed radial forces applied to one end thereof, the lower rim edge of said main body having a plurality of openings therethrough, a perforated bottom for said flower pot comprising a disk of rigid sheet material having tabs extending radially from the rim thereof and positioned to seat in a respective one of said openings, said disk and its tabs cooperating to hold the flexible walls of said main body extended and to support a filling of soil, said seam being readily separable to permit removal of the side walls and bottom of the flower pot without disturbing the soil or the roots of a plant therein whereby said undisturbed soil and plant roots may be transplanted without molesting the plant's roots, and a low-height frusto-conical separator member having a diameter slightly less than the diameter at the interior upper end of said main body, said separator having a plurality of openings therethrough to fit about the base of a plant stem and to permit passage of water into the soil filling the pot, and said separator being impervious to water and serving to support a layer of decorative stones or the like out of contact with the soil filling of the pot.

References Cited in the file of this patent
UNITED STATES PATENTS

| | | |
|---|---|---|
| 451,064 | McAlpin | Apr. 28, 1891 |
| 562,674 | Spiegle | June 23, 1896 |
| 1,992,878 | Muller | Feb. 26, 1935 |
| 2,160,998 | Wilson | June 6, 1939 |
| 2,691,848 | Arena | Oct. 19, 1954 |
| 2,756,172 | Kidd | July 24, 1956 |
| 2,834,153 | Fearn | May 13, 1958 |